March 19, 1968  J. A. SHOOK  3,373,701
LATCH STRUCTURE FOR FREIGHT-BRACING APPARATUS
Filed Jan. 3, 1966
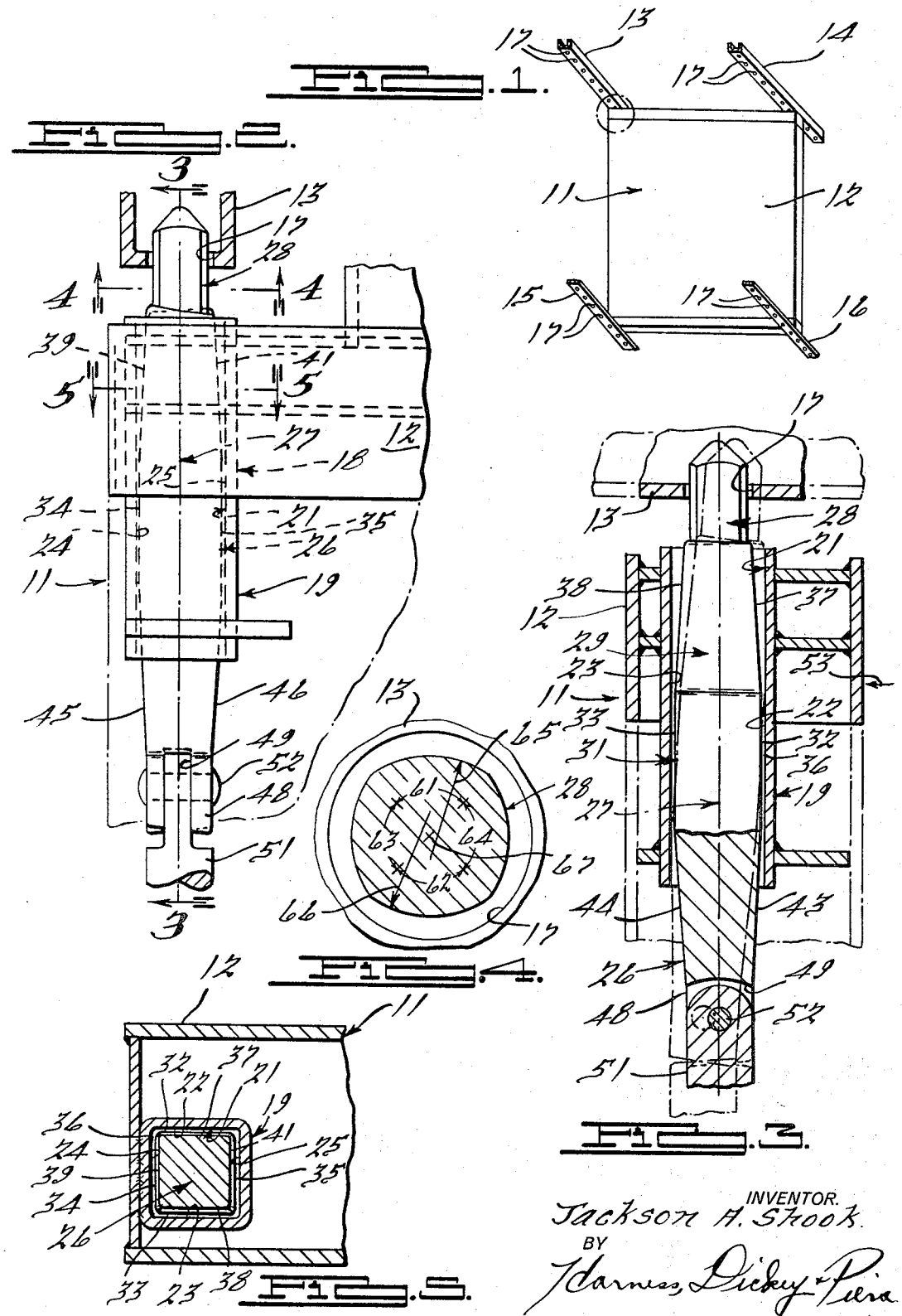
INVENTOR.
Jackson A. Shook.
BY
Harness, Dickey & Pierce
ATTORNEYS.

United States Patent Office 3,373,701
Patented Mar. 19, 1968

3,373,701
LATCH STRUCTURE FOR FREIGHT-BRACING APPARATUS
Jackson A. Shook, Northville, Mich., assignor to Evans Products Company, a corporation of Delaware
Filed Jan. 3, 1966, Ser. No. 518,204
15 Claims. (Cl. 105—376)

ABSTRACT OF THE DISCLOSURE

A freight-bracing bulkhead assembly embodying a latch structure for resisting galling under the influence of force loading comprised of a latch member and a supporting member. The supporting member supports the latch member for reciprocation along a nominal axis between latched and unlatched positions. The latch member has a latch part adapted to engage a cooperating latch member in its latched position and a shank portion. The supporting member defines a socket portion for guidingly engaging the shank portion of the latch member with sufficient clearance for tilting movement of the shank portion from the normal axis. The shank and socket portions have first surfaces at one end of one of the portions that are non-parallel in the normal position and in parallel abutting relation in the displaced position to increase the contact area between the portions upon tilting movement under the influence of force loading.

---

This invention relates to a freight-bracing apparatus and more particularly to an improved latching mechanism for a freight-bracing apparatus.

The use of adjustable bulkheads or other similar freight-bracing devices for restraining freight against movement within cargo carrying vehicles such as railway cars is well known. When using a bulkhead for this purpose it is common practice to provide a locking mechanism to retain the bulkhead in any of a plurality of positions with respect to the cargo area. The most typical form of locking mechanism comprises latch pins positioned at the four corners of the bulkhead that engage corresponding apertures formed at respective locations along the cargo carrying area to fix the bulkhead in its adjusted position. Preferably, some clearance must be provided to facilitate operation between the lock pin and its supporting member as well as the aperture which it engages. When such clearances are provided, however, the shifting of the bulkhead under the force of shock loading, which can be quite high in many instances, causes damage to the lock pin, its supporting socket or both.

The clearance between the lock pin and the supporting socket permits the lock pin to tilt with respect to its normal axis of reciprocation under shock loadings. This tilting causes high stress concentrations at the opposite ends of the lock pin and socket since these are the only contacting areas. The high stress concentrations cause damage to the lock pin and socket. Galling of the lock pin and its socket is a common problem and can become so severe as to cause the lock pin to be frozen in either its engaged or its disengaged position.

It is, therefore, a principal object of this invention to provide a latch structure that will accommodate force loading without damage.

It is a further object of this invention to provide an improved lock pin construction for a freight-bracing bulkhead.

A latch structure for resisting galling under the influence of force loading embodying this invention is comprised of a latch member and a supporting member. The supporting member supports the latch member for reciprocation along a nominal axis between latched and unlatched positions. The latch member has a latch part adapted to engage a cooperating latch member in its latched position and a shank portion. The supporting member defines a socket portion for guidingly engaging the shank portion of the latch member with sufficient clearance for tilting movement of the shank portion from the normal axis. The shank and socket portions have first surfaces at one end of one of the portions that are non-parallel in the normal position and in parallel abutting relation in the displaced position to increase the contact area between the portions upon tilting movement under the influence of force loading.

As has been previously noted, the locking mechanism normally includes a latch pin that engages an aperture for locking the members with respect to each other. The aperture is most conventionally circular in shape as is at least a portion of the latch pin. Since there is clearance between the latch pin and the aperture to facilitate smooth operation, relative movement between the parts concentrates the shock forces over a very small area of engagement. In fact, in many instances only point contact results because of the differences in diameter.

It is, therefore, a still further object of this invention to provide an improved locking pin construction.

A locking pin embodying this invention is adapted to engage a larger size circular aperture with minimized stress concentration under force loading. The locking pin has a cross section in the plane of the aperture when received therein that is comprised of at least one segment having a radius substantially equal to the radius of the aperture. The width of the cross-section of the locking pin is substantially less along this radius than twice the radius.

Other objects and advantages of this invention will become more apparent as this description proceeds, particularly when considered in conjunction with the accompanying drawings, wherein:

FIGURE 1 is a schematic perspective view of a freight-bracing bulkhead assembly embodying this invention;

FIGURE 2 is an enlarged elevational view of the encircled area in FIGURE 1;

FIGURE 3 is a cross-sectional view taken along the line 3—3 of FIGURE 2;

FIGURE 4 is an enlarged cross-sectional view taken along the line 4—4 of FIGURE 2; and FIGURE 5 is a cross-sectional view taken along the line 5—5 of FIGURE 2.

Referring now in detail to the drawings and in particular to FIGURE 1, a freight-bracing bulkhead assembly embodying this invention is illustrated schematically and identified generally by the reference numeral 11. The bulkhead assembly 11 is comprised of a built-up structural member 12 that is adapted to engage freight or the like contained within some form of cargo containing area, normally that of a freight carrying vehicle. The bulkhead assembly 11 has a particular application to the use of bracing freight within a railway car but the use of the invention described herein is not so limited. The bulkhead assembly 11 is adapted to be adjustably positioned at any of a plurality of longitudinally spaced positions within the cargo area and for this purpose a pair of upper pin plates 13 and 14 and lower pin plates 15 and 16 are fixed in the cargo area adjacent the four corners of the bulkhead assembly 11. The pin plates 13, 14, 15 and 16 may be affixed in any suitable manner to the cargo carrying area and each is provided with a plurality of longitudinally spaced circular apertures 17.

Referring now to the remaining figures, a latch assembly, indicated generally by the reference numeral 18, is provided in each of the four corners of the bulkhead assembly 11 for coaction with the apertures 17 in the tracks 13, 14, 15 and 16 to restrain the bulkhead assembly 11 in an adjusted position. Each latch assembly 18 is comprised of a supporting member 19 of generally tubular form that is fixed to the structural member 12 in any suitable manner and defines a generally square cross-sectional shaped, vertically extending opening 21. The opening 21 is defined by a pair of parallelly extending side surfaces 22 and 23 which may be considered thrust surfaces and a pair of parallelly extending side surfaces 24 and 25 that are perpendicular to the surfaces 22 and 23.

The opening 21 defines a socket in which a latch pin 26 is supported for reciprocal movement along a generally vertically extending nominal axis, indicated by the reference numeral 27. The axis 27 is parallel to the surfaces 22, 23, 24 and 25 and defined by them.

The latch pin 26 has a pin portion, indicated generally by the reference numeral 28, which portion is adapted to engage the respective aperture 17 when in its engaged position for locking the bulkhead assembly 11 in an adjusted position. Adjacent the pin portion 28, a shank portion (FIGURE 3), indicated generally by the reference numeral 29, is provided. The shank portion 29 is comprised of an intermediate section 31 of relatively short length which section is defined by four parallel sides 32, 33, 34 and 35. The sides 32, 33, 34 and 35 extend generally parallel to the adjacent socket surfaces 22, 23, 24 and 25, respectively, and are spaced inwardly therefrom to provide a clearance area 36. In practice, the section 31 may be very short in length for a reason which will become more apparent as this description proceeds.

From the section 31, both ends of the shank portion 29 taper or converge toward the respective ends of the latch pin 26, that is, the upper end portion of the latch pin 26 adjacent the pin portion 28 is defined by a first pair of side surfaces 37 and 38 that are non-parallel with the nominal axis of reciprocation 27 and non-parallel with each other. The upper portion is completed by side surfaces 39 and 41, which also converge toward the upper end of the pin portion 28.

The end of the latch pin 26 below the section 31 is defined by a pair of converging side surfaces 43 and 44 that are non-parallel to the nominal axis of reciprocation 27 as well as being non-parallel to each other. The surface 43 is, however, parallel to the surface 38 and the surface 44 is parallel to the surface 37. The perpendicular distance between the surfaces 38 and 43 and 37 and 44 is equal to the distance between the socket surfaces 22 and 23. The lower section of the latch pin 26 is completed by non-parallel surfaces 45 and 46 which also converge toward the lower end of the locking pin 26.

At the lower end of the locking pin 26, a yoke 48 is formed that provides a pocket 49 in which the upper end of an operating link 51 is received. The upper end of the link 51 is pivotally connected to the yoke 48 by means of a pivot pin 52. The operating link 51 is actuated by a suitable operating mechanism (not shown) to cause reciprocation of the latch pin 26 within the socket 21 along the nominal axis 27 for movement of the pin portion 28 into and out of engagement with the respective aperture 17. An operating mechanism is preferably provided that will actuate the latch pins 26 at each of the four corners of the bulkhead assembly 11 simultaneously.

It was heretofore the normal practice to provide a latch pin having a shank portion defined by surfaces parallel to the adjacent surfaces of the socket. That is, the socket and latch pin were formed with parallel surfaces that extended in the same direction as the axis of reciprocation of the latch pin. It, however, was necessary to provide some clearance between the socket and the latch pin shank to accommodate for manufacturing tolerances and to insure smooth operation. Under shock loading, which can reach high magnitudes in railway freight travel, the latch pin shank portion was tilted at an angle with respect to the supporting socket portion due to its engagement with the pin plate. This tilting results in localized contact between the socket and shank at the opposite ends thereof. The localized contact causes galling of the pin, socket or both which would eventually cause the latch pin to freeze in its engaged position or render operation extremely difficult. This invention obviates the aforementioned problem by insuring a maximum contact area upon this relative movement while maintaining the required clearances.

FIGURE 3 illustrates the latch pin 26 in a dotted line position which it would assume under a loading force in the direction of the arrow 53 in FIGURE 3. When this movement occurs, the locking pin surfaces 37 and 44 move into surface-to-surface contact with the respective ends of the socket surfaces 22 and 23 to insure a maximum contact area. Surface contact results since, as has been noted, the spacing between the surfaces 37 and 44 is equal to the spacing between the surfaces 22 and 23. Thus, the high shock loadings will be exerted over a large contact area at each end of the socket, which contact area is defined by the surfaces 37 and 44. It should be readily apparent that shock loading in a direction opposite to the arrow 53 will cause the engagement between the surfaces 38 and 43 and the surfaces 23 and 22. The short length of the section 31 causes it not to interfere with this tilting from the normal axis 27. If desired, a similar relation of the taper of the surfaces 39, 41, 45 and 46 will accommodate shock loadings in directions perpendicular to the arrow 53.

It will also be noted that shock loading the pin portion 28 moves relative to the aperture 17 in which it is received. If the pin portion 28 were circular in cross-section in the plane of the aperture 17, only a point contact would occur between the pin portion 28 and the area of the track 13 which defines the adjacent portion of the aperture 17. The point contact would result because of the difference in radii required to provide the necessary clearance for smooth operation and to facilitate alignment. This localized contact also can cause galling of the pin portion 28 or aperture 17.

Galling is reduced by forming the pin portion 28 from first and second segments contained within the angles 61 and 62 (FIGURE 4) which are interconnected by segments defined by the angles 63 and 64. The segments 61 and 62 are defined by arcs of a circle having radii 65 and 66, respectively. The radii 65 and 66 are equal to each other and are equal to the radius of the aperture 17. The centers of the radii 65 and 66, however, are offset from the center 67 of the pin portion 28 on opposite sides thereof so that the width of the locking pin will be less than the diameter of the aperture 17. Said another way, the width of the locking pin portion 28 in the plane of the aperture 17 when received therein is less than the sum of the radii 65 and 66. The portions within the arcs 63 and 64 also are formed in a manner similar to the segments 61 and 62 if transverse shock loading is expected.

In the described embodiment, the socket 21 is formed with parallelly extending side walls that extend to define the nominal axis of reciprocation of the pin 26 and the respective ends of the latch pin are tapered. It is to be understood, however, that the pin shank portion of the pin may be defined by sides parallel to the axis and the socket formed with tapered sides. In such an embodiment, the socket ends would diverge toward their respective ends. In addition, the pin portion 28 could be offset with respect to the nominal axis 27 so that further increase in contact area between the pin portion 28 and the aperture 17 would be provided. Various other changes and modifications will suggest themselves to those skilled in the art and are intended to be encompassed within the broad scope of the invention, as defined by the appended claims.

What is claimed is:

1. A latch structure for resisting galling under the influence of force loading in at least one direction comprising a latch member and a supporting member for supporting said latch member for reciprocation along a nominal axis between latched and unlatched positions, said latch member having a shank portion and a latch part adapted to engage a second latch member in its latched position, said supporting member defining a socket portion guidingly engaging said shank portion, said portions defining a clearance therebetween in the direction of force loading for tilting thereof from a normal disposition with respect to each other to a displaced disposition with respect to each other, each of said portions having a respective adjacent surface at one end of one of said portions, said respective surfaces being disposed in a substantially non-parallel converging relationship to each other when said portions are in said normal disposition, said respective surfaces being in parallel abutting relationship when said portions are in said displaced disposition for increasing the amount of contact therebetween upon the application of force loading in said one direction.

2. A latch structure as set forth in claim 1 wherein the respective surface of the socket portion is substantially parallel to the nominal axis and defines the nominal axis.

3. A latch structure as set forth in claim 1 wherein the respective surface of the socket portion is substantially parallel to the nominal axis and defines the nominal axis with an opposing parallel surface of said socket portion, the latch member shank portion having intermediate surfaces of relatively short length parallel to and spaced inwardly from the opposing socket portion surfaces, the respective surface of said shank portion being formed at one end thereof and being non-parallel to said intermediate surfaces.

4. A latch structure as set forth in claim 1 wherein the first mentioned respective surfaces of the shank and socket portions lie on one side of the nominal axis and each of said portions further include a second adjacent respective surface on the other side of said nominal axis, said second respective surfaces being disposed in substantially non-parallel relationship when said portions are in said nominal disposition, said second respective surfaces being disposed in substantially parallel abutting relationship when said portions are in a displaced disposition for increasing the amount of contact therebetween.

5. A latch structure as set forth in claim 4 wherein the first and second respective surfaces of one of the portions are parallel to each other.

6. A latch structure as set forth in claim 5 wherein the parallel respective surfaces of the one portion are spaced apart a distance equal to the spacing between the first respective surfaces of the other of the portions.

7. A latch structure as set forth in claim 4 wherein the first and second respective surfaces of one of the portions converge toward one end of the one portion.

8. A latch structure as set forth in claim 4 wherein each of the portions include respective adjacent third and fourth surfaces on opposite sides of the nominal axis at the other end of one of said portions, the respective of each of said third and fourth surfaces being disposed in substantially non-parallel relationship when said portions are in the normal disposition and being in substantially parallel abutting relationship when said portions are in a displaced dispositon.

9. A latch structure as set forth in claim 8 wherein the first and third surfaces of the socket portion are coextensive, the second and fourth surfaces of said socket portion being coextensive and parallel with said first and third socket portion surfaces, the shank portion having intermediate parallel surfaces spaced inwardly from and parallel to said socket portion surfaces when said shank portion is in its normal disposition, the first and second surfaces of said shank portion converging toward one end thereof and the third and fourth surfaces of said shank portion converging toward the other end thereof.

10. A latch structure as set forth in claim 1 wherein the latch member comprises a latch pin and the second latch member defines a circular aperture in which said latch pin is adapted to be received, said latch pin having a cross-section in the plane of the aperture and when received therein comprised of at least one arcuate segment, which segment is a portion of a circle having a radius substantially equal to the radius of the aperture, said cross-section of said latch pin being substantially less in width along the radii of said segment than twice the radius of said segment.

11. A latch structure as set forth in claim 10 wherein the cross-section in the plane of the aperture includes a second curved segment, which segment is a portion of a circle having a radius substantially equal to the radius of the aperture, said second curved segment being diametrically opposed to said one curved segment.

12. A latch structure comprising a member defining a circular aperture and a latch pin supported for movement into and out of engagement with said aperture without localized contact under force loading, said latch pin having a cross-section in the plane of said aperture and when received therein comprised of at least one curved segment, said one curved segment being a segment of a circle having a radius substantially equal to the radius of said aperture, said cross-section of said latch pin being substantially less in width along the radii of said curved segment than twice the radius of said curved segment.

13. A latch structure as set forth in claim 12 wherein the cross-section of the latch pin in the plane of the aperture includes a second curved segment, which curved segment is a segment of a circle having a radius substantially equal to the radius of the aperture, said second curved segment being diametrically opposed to said one curved segment.

14. A latch structure as set forth in claim 11 in combination with a freight bracing bulkhead, the supporting member of the latch structure being affixed to said bulkhead at one corner thereof.

15. The combination as set forth in claim 14 wherein the bulkhead is generally rectangular in shape and a latch structure of the defined type is provided at each corner of said bulkhead.

References Cited
UNITED STATES PATENTS

| | | | |
|---|---|---|---|
| 3,185,111 | 5/1965 | Hess et al. | 105—376 |
| 3,241,502 | 3/1966 | Magarian et al. | 105—376 |

ARTHUR L. LA POINT, *Primary Examiner.*

DRAYTON E. HOFFMAN, *Examiner.*